United States Patent
Ryan et al.

(10) Patent No.: US 12,551,626 B2
(45) Date of Patent: Feb. 17, 2026

(54) NEEDLE-FREE DELIVERY

(71) Applicant: AVAXMED LIMITED, Abingdon (GB)

(72) Inventors: Owen Ryan, Wicklow (IE); Pascal Launois, Dublin (IE); David Grant, Faringdon (GB)

(73) Assignee: AVAXMED LIMITED, Abingdon (GB)

( * ) Notice: Subject to any disclaimer, the term of this patent is extended or adjusted under 35 U.S.C. 154(b) by 827 days.

(21) Appl. No.: 17/787,079

(22) PCT Filed: Dec. 8, 2020

(86) PCT No.: PCT/GB2020/053140
§ 371 (c)(1),
(2) Date: Jun. 17, 2022

(87) PCT Pub. No.: WO2021/123736
PCT Pub. Date: Jun. 24, 2021

(65) Prior Publication Data
US 2023/0043827 A1 Feb. 9, 2023

(30) Foreign Application Priority Data
Dec. 18, 2019 (GB) .................................... 1918706

(51) Int. Cl.
*A61M 5/30* (2006.01)
*A61M 5/315* (2006.01)
*A61M 37/00* (2006.01)

(52) U.S. Cl.
CPC .......... *A61M 5/30* (2013.01); *A61M 5/31535* (2013.01); *A61M 5/31573* (2013.01);
(Continued)

(58) Field of Classification Search
CPC .... A61M 5/30; A61M 5/3158; A61M 5/3015; A61M 37/0069
See application file for complete search history.

(56) References Cited

U.S. PATENT DOCUMENTS

| 7,862,543 B2 * | 1/2011 | Potter | F42B 12/54 |
| | | | 604/218 |
| 8,092,419 B2 * | 1/2012 | Matusch | A61M 5/30 |
| | | | 604/72 |

(Continued)

FOREIGN PATENT DOCUMENTS

| EP | 1545662 A1 | 6/2005 |
| GB | 1379358 A | 1/1975 |

(Continued)

OTHER PUBLICATIONS

JP2006512106A machine translation (Year: 2006).*

(Continued)

*Primary Examiner* — Laura A Bouchelle
(74) *Attorney, Agent, or Firm* — Maine Cernota & Curran

(57) ABSTRACT

The invention concerns improvements in needle-free devices for delivery of therapeutic and/or prophylactic agents, such as solid dose drugs, including vaccines. The needle-free device disclosed herein comprises novel structural arrangements and modes of actuation and operation, resulting in enhanced functionality and benefits to the user and/or patient.

18 Claims, 13 Drawing Sheets

(52) U.S. Cl.
CPC ...... *A61M 5/3158* (2013.01); *A61M 37/0069* (2013.01); *A61M 2205/582* (2013.01); *A61M 2205/583* (2013.01); *A61M 2205/8281* (2013.01)

(56) References Cited

U.S. PATENT DOCUMENTS

| | | |
|---|---|---|
| 2007/0275044 A1 | 11/2007 | Potter |
| 2016/0114107 A1 | 4/2016 | Soerensen |
| 2016/0368018 A1 | 12/2016 | Moser |

FOREIGN PATENT DOCUMENTS

| | | | | |
|---|---|---|---|---|
| GB | 2138298 A | | 10/1984 | |
| GB | 2391480 A | | 2/2004 | |
| JP | 2006512106 A | * | 4/2006 | ............ A61M 5/347 |

OTHER PUBLICATIONS

International Search Report and Written Opinion for PCT Appl. No. PCT/GB2020/053140 mail date May 4, 2021, 20 Pages.
GB Further Search Report for Patent Appl. No. GB1918706.1 mail date Feb. 1, 2021, 1 page.
GB Combined Search and Examination Report for Patent Appl. No. GB2104087.8 mail date Apr. 20, 2021, 3 pages.

* cited by examiner

NEEDLE-FREE DELIVERY

RELATED APPLICATIONS

This application is a national phase application filed under 35 USC § 371 of PCT Application No. PCT/GB2020/053140 with an International filing date of Dec. 8, 2020, which claims priority of GB Patent Application 1918706.1 filed Dec. 18, 2019. Each of these applications is herein incorporated by reference in its entirety for all purposes.

FIELD OF THE INVENTION

This disclosure relates to improvements in a needle-free device for delivery of therapeutic and/or prophylactic agents, such as solid dose drugs, including vaccines. In particular, the needle-free device disclosed herein comprises novel structural arrangements and modes of actuation and operation, resulting in enhanced functionality and benefits to the user and/or patient.

More particularly, the disclosure and invention herein relates to a new needle-free device for delivery of solid dose therapeutic and/or prophylactic agents, the device having a re-setting mechanism with improved reliability, permitting delivery of at least one therapeutic compound, such as a vaccine (or a formulation comprising the same) with improved safety and reliability.

There is further disclosed a needle-free device for delivery of therapeutic and/or prophylactic agents, such as solid drugs, including vaccines, comprising a cassette releasing mechanism, further enhancing the safety and user experience when undertaking delivery of a therapeutic or prophylactic agent.

The invention further concerns use of and methods relating to the needle-free delivery.

BACKGROUND TO THE INVENTION

A common route of administration of therapeutic or prophylactic agents is via parenteral delivery of a liquid formulation using needles and syringes. Parenteral delivery is used for therapeutic or prophylactic agents that are usually poorly absorbed by other routes and/or require rapid delivery. Parenteral delivery is also one of the more efficient routes for delivery compared to other standard delivery routes such as oral or pulmonary delivery.

Among the disadvantages with parenteral delivery via a needle is the associated discomfort and pain for the patient and the health risk caused by used sharps.

A large proportion of therapeutic or prophylactic agents are poorly soluble, often resulting in the production of sub-optimal formulations. In addition, they are typically less stable in aqueous form than in a solid dose form Potentially, drugs may be administered by accelerating powders to a velocity at which they can penetrate the outer layers of the skin. Such systems typically require a velocity of several hundred metres per second in order to penetrate human tissue. Other systems use solid rods or splinters of a therapeutic compound that can be pushed at a relatively low velocity into the skin without the requirement for a needle.

The present applicants have successfully developed their own needle-free solid-dose delivery technology used as a means for introducing solid dose therapeutics, including proteins and vaccines. The development of the technology is described in at least International applications WO2003/023773, WO2004/014468, WO 2006/082439, WO 2006/082439 and WO2017/068351.

The originating methods include delivering compounds or formulations by penetrating the skin with a pioneer projectile and introducing behind the projectile, the therapeutic of interest in a liquid, semiliquid or solid dose form. However, devices also permit solid dose delivery without the need for pioneer projectiles.

These devices, suitable for needle-free delivery, are described by the present applicants at length and in a number of varying iterations and embodiments, for example, U.S. Pat. No. 8,574,188 and other disclosures.

A needle-free device of this general type includes a disposable single-use component (also herein referred to as a cassette) and an actuator which is re-usable. The generic mechanism devised by the present applicants, by which the device and cassette operate, is described briefly herein but can be found in detail within the above international patent publication references.

The disposable cassette comprises a central aperture in which an ejector or drive pin is mounted behind a drug package or injectate, which comprises a therapeutic agent and/or formulation. The disposable component, housing the drug package can be loaded into the actuator by positioning it e.g. by screwing it into the inner of the housing end of the actuator device.

The front-end of the housing is in operative communication with the cassette, such that when assembled therewith and the device is operated, an actuation mechanism of the device generates a force sufficient to push the drug package from the cassette.

Actuation may initially trigger with a push button or by pushing the disposable cassette (already loaded into the actuator device) against the skin. Under the force of a spring in the rear-end of the device, a striker (such as a hammer or spindle) travels along a guide within the housing and contacts the pin. The pin (drive pin, in the present disclosure) comprises a flat head and an elongate body and is positioned such that when it is contacted the drug package is pushed along a central aperture and out from the cassette jaws. The energy generated is sufficient to permit the drug package to pierce the skin. The pin continues to push the drug package into the patient to the required depth, which is determined in part by the package length and the extent to which it is pushed by the pin.

Then the devices of the applicant enable the skin to be penetrated by the drug package even when administered at a low velocity. Low velocity is typically defined in this context at less than 100 m/s, but preferably the velocity is less than 10 m/s. Since the drug is pushed at a low velocity rather than fired at a high velocity it is possible to ensure that the dosage is always delivered to the correct (and same) depth under the skin. This means that the system can be used on different skin types and skin locations and the dosage will still be delivered to the same depth. However, there remain several challenges in the needle-free delivery of solid dose drug therapy.

In user operated delivery devices, it is desirable that the re-usable component i.e. the actuator device can be easily and reliably reset post actuation. In one aspect the present invention therefore comes about from a desire to improve the reliability of needle-free drug delivery devices.

Further, the means by which the disposable cassette is removed from the device, post actuation, is significant and despite the lack of a risk of needle-stick injury in order to improve the administrator comfort and compliance, minimal contact with the recently injected end is desirable. The invention therefore rises from a need to provide a needle-free agent device for the delivery of therapeutic and/or prophylactic agents and/or a method of operating the same, which facilitates administrator use and/or self-use.

SUMMARY OF THE INVENTION

The invention herein disclosed comprises a needle-free device for the delivery of at least one therapeutic and/or prophylactic agent comprising a housing having:
- a rear-end including a force generator and rear piston;
- a front-end for receipt of a cassette comprising a solid therapeutic and/or prophylactic agent for delivery, the comprising a front piston having a central aperture defining an axis, the piston being slidably mounted within the front-end;
- a spindle positioned between the front-end and rear-end and operatively communicating the rear piston with the front-end of the device, the spindle having a spindle tip configured to be laterally movable between an position axially aligned with the central aperture and axially offset position;
- a reset spring seat;
- a reset spring, positioned between spring seat and the front piston; and
- a spindle retaining element, structurally and functionally configured to exclusively retain the spindle in the axially offset position.

Safety and reliability in relation to device operation is very important to ensure correct delivery of the dose and the medicinal or prophylactic effect. The present applicants determined that re-setting of the device could fail and, in such instances, further use of the device by the patient/user may be prevented.

The present invention provides a new solution to this issue. The re-configuration of the mechanism and inclusion of a novel combination of features disclosed herein ensures that risk of failure of the re-setting mechanism is avoided and re-use of the delivery device with each new therapeutic and/or prophylactic agent cassette by the patient or clinician is reliably enabled.

The delivery device disclosed herein enables the spindle to be reliably freed from its central axis and crucially, is always successfully retained in a non-axially aligned or offset position when the front piston is in its most forward position, i.e. when no cassette is attached.

Firstly, the reset spring, being placed between the reset spring seat and the front piston, ensures that the piston is in its most forward position when no cassette is attached, enabling the spindle tip to rest in a radially outward position, offset from the central axis.

Secondly, where previous devices functioned to return the spindle to the offset position, such arrangements nonetheless displayed reset failure, as described above. Until investigation and further development of the device structure was undertaken by the present applicant, the cause of the reset failure was not understood or remained uncharacterised. Without being bound by theory, it was elucidated that the probable cause of the reset failure stemmed from the inherent use of existing features (already present in the device) to multiple functions. In other words, existing features which provided additional function, above their primary mechanistic role in the actuation of the device, but that function could be suboptimal. A different solution was needed to avoid the re-set failure and improve reliability.

Usefully, the applicant found that the new configuration of the device of the invention, including introduction of a new separate element, which is mechanistically independent (i.e. not already present/essential for use in the primary actuation of the device) enabled reset failure to be avoided. A mechanistically independent spindle retaining element, functioning solely to retain the spindle on the off-set position, was found to do so successfully, without exception, and hence provided an improvement over devices of the prior art. Usefully, the new configuration and combination of features, including the independent structural feature of the retaining element provides sufficient additional force needed to retain the spindle tip in a laterally offset position and thus the spindle and will not unintentionally move. It was determined through thorough testing that the operation of the device of the current invention successfully avoids the reset failure events.

In some embodiments where the spindle tip is in the offset or non-axially aligned position, the tip abuts or is held against the front piston; in particular, it abuts a back surface of the front piston, whereas in the axially aligned position the spindle's tip is aligned with the central aperture axis in the front piston. For example, a back-facing surface of the front piston temporarily abuts a back surface of the piston (until the device is re-loaded with a new cassette, primed and actuated). This surface may therefore releasably secure the spindle in the non-axially aligned position prior to actuation and then again after actuation.

In embodiments, the spindle retaining element retains the spindle tip in the axially offset by the attraction force laterally spaced from the central axis of the aperture.

The force generator may comprise a compression or actuation spring.

In preferred embodiments, the reset spring and actuation spring are not positioned in series. Mechanisms of the prior art have used a resetting spring placed in series with the actuation spring in an effort to provide the force required for the reset and thus keep the spindle in permanent contact with the rear piston and to keep the front piston in its most forward position so that the spindle is clear from the front piston central hole. However, this is not desirable as the length of the device may be compromised. The delivery requires a target velocity of 6 m/s and this necessitates a minimum acceleration distance. A portion of the energy delivered by the actuation spring is absorbed by the reset spring so additional acceleration distance is required to compensate for this energy absorption resulting in an increased overall length of the device. Therefore, in preferred embodiments, the reset spring and the actuation spring are provided in a parallel arrangement. Such an arrangement is useful because the present resetting mechanism involves the front piston moving forward to a position where the spindle tip is free from and not engaged with the front piston central hole and thus allows the spindle tip to return to the axially offset position until the triggering point is reached but does not result in a requirement for a greater acceleration distance. Advantageously, this allows for a shorter and thus more compact device.

The means, by which displacement is achieved, e.g. in part by use of lateral force and/or radial attraction, can be implemented by a number of different embodiments. The spindle retaining element may therefore be positioned adjacent to the spindle tip.

In one embodiment the attraction element is a magnetic ring and at least part of the spindle or spindle tip comprises metal. In preferred embodiments the ring is a unipolar radial magnetic ring. The ring may be positioned inside a back end of the front piston, which may be open. In such embodiments the magnetic field generated by the ring attracts the metallic spindle tip. For example, during the reset phase, the front piston moves forward due to the reaction force applied by the reset spring, allowing the spindle and spindle tip to disengage from the front piston central aperture and be drawn by the magnetic attraction towards magnetic ring, where it is temporarily held in the axially offset position.

In other embodiments, the spindle retaining element is configured to bias the position of the spindle. The spindle retaining element may comprise a secondary coil housed within a coil of the reset spring. In particular, one end of the reset spring may be coiled in a helix pattern. The inner portion of the coil may have an inner diameter slightly larger than the diameter of the front-end of the spindle. However, the final coil formed by the helix is offset from the central axis and thus displaces the tip of the spindle from the central axis during reset.

In some embodiments, the spindle retaining element comprises a spring wire having an anchoring geometry and attached to the front piston. The anchoring geometry comprises a dual pitch coil which serves to hold the tip of the spindle with at least minimum clearance from the central axis. The anchoring geometry is configured in profile to temporarily draw/bring the spindle out of alignment during reset with the aperture of the front piston and into the offset position.

In some embodiments the rear piston adjoins the spindle by a rotational joint. In some examples the rear piston may comprise a female connection or socket for the receipt of a corresponding male connection, located at the rearward end of the spindle. The male connection of the spindle may comprise a ball for an improved and secure rotational movement with the rear piston. A rotatable connection between the rear piston and the spindle, such as a ball-socket joint may help increase movement of the spindle tip placement at the forward end of the spindle. In particular, the connection allows for the spindle to pivot laterally with minimum friction improving the ability of the reset to be biased by the displacement mechanisms discussed. For example, the displacement of the spindle tip may be more precise and consistent.

In further embodiments, the ball socket may clamp onto the spindle. Structurally, this may allow the reset spring to be placed in a parallel arrangement, as it is no longer required to hold the spindle in place.

In some embodiments the rear piston is configured to improve accuracy during guidance of the spindle. Further, this may help minimise friction between moving components during the actuation of the device and reduce the actuation force required of the device. In some embodiments, the rear piston may comprise a front shoulder or alternatively an extended rearward end to improve engagement within the rear-end of the housing and its guiding post.

The device may further comprise an alignment mechanism. In such cases alignment is effected by the alignment sleeve which has a ramp with a surface profile. The spindle may have an enlarged middle or central section. During priming of the device, the spindle middle section contacts the alignment sleeve ramp which brings the spindle to central axis, aligning the spindle axially and permits release of the spindle tip through a guiding hole under force from the actuation spring.

In preferred embodiments, the cassette used with the device houses a drug package such as a solid formulation comprising or housing the therapeutic and/or prophylactic agent. This may particularly include solid dose vaccines for the prevention or therapy of disease, or solid dose immunological agents, e.g. for the treatment or prevention of allergy conditions.

Due to the way the cassette is fitted into the front-end of the delivery device (via a bayonet arrangement described hereinbefore) disconnection post actuation may require handling. Users have indicated the geometry of the used cassette presents a challenge to remove in a controlled/precisely timed manner without manual manipulation of the cassette itself.

The applicant has therefore developed a further technical solution to enable removal of the cassette without physical handling of the cassette itself.

The device as previously described may further comprising a cassette release and automatic ejection mechanism, the front-end and rear-end being axially rotatable relative to one another and external axial rotation of the front-end relative to the rear-end, releases the cassette from an internal structural constraint within the front-end such that force of the reset spring acting on the front piston causes automatic ejection of the cassette from the device.

The invention therefore extends to a needle-free device for delivery of a therapeutic and/or prophylactic agent comprising: a rear-end including a force generator for pushing a solid drug comprising a therapeutic and/or prophylactic agent from said device; a front-end for receipt of a cassette comprising the drug, the front-end comprising a front piston slidably mounted therein; and a cassette release and automatic ejection mechanism, in which the front-end and rear-end are axially rotatable relative to one another and external axial rotation of the front-end relative to the rear-end, releases an internal structural constraint for retaining the cassette within the front-end, enabling force acting on the front piston to causes automatic ejection of the cassette from the device.

This novel arrangement of device facilitates a semi-automatic disconnection (manual twisting of the to release and then automatic ejection) by simple and easily identifiable user movement in order to execute quick but controlled disposal of a used cassette from the device. This further reduces contamination risk in needle-free delivery and permits the device to be re-used (unloaded and re-loaded with the drug consumables) efficiently, which can be particularly helpful in field-based environments.

Whilst such an arrangement constitutes its own inventive concept by providing a combination and arrangement of features used to solve the technical problem of contamination by handling, in particularly preferred embodiments this invention may be utilised with before described device. This combination may be combined with the device to provide further advantages in the field of needle-free delivery.

This unique combination of the two aspects of the invention together provide further advantages in the field of needle-free delivery of drugs and vaccines.

The invention further relates to a needle-free method of preventing or treating disease, comprising utilising the device described above to deliver a solid drug comprising a therapeutic or prophylactic agent to a patient in need thereof.

BRIEF DESCRIPTION OF THE DRAWINGS

The various aspects of the invention will now be described, by way of example only, with reference to the following drawings.

DETAILED DESCRIPTION

Figure 1:
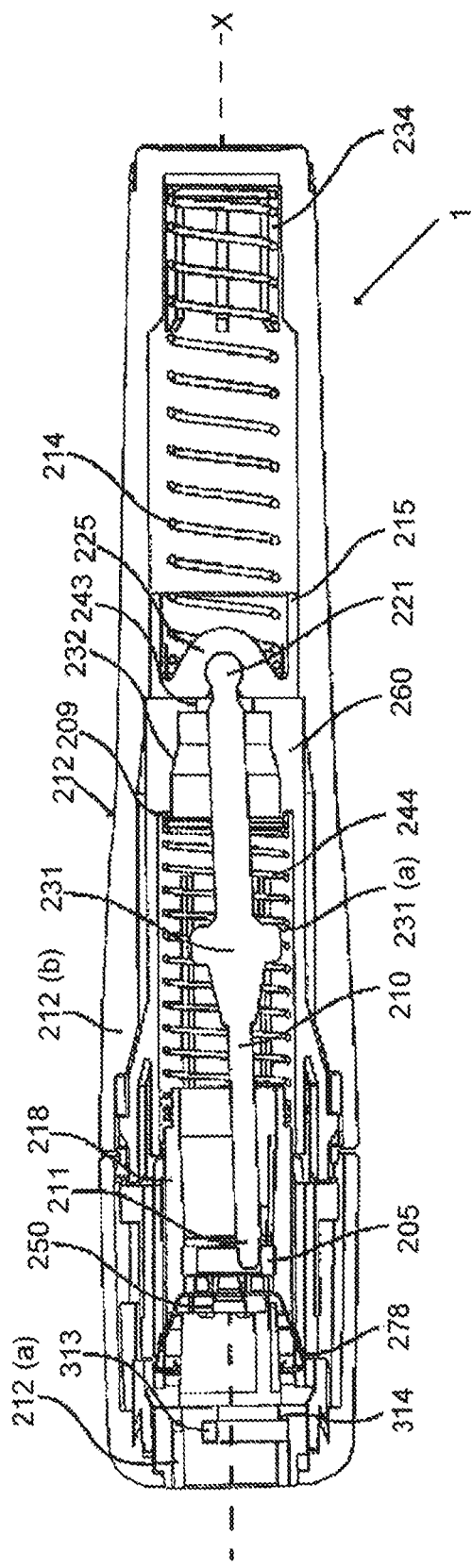
FIG. 1 shows a cross-sectional view of a needle-free device in accordance with the invention wherein the device is in a non-activated position and prior to loading a cassette assembly.

In FIG. 1, an example of the needle-free delivery device of the invention is shown. A cross-sectional view shows the delivery device (1) in a pre-actuated state and before a cassette is loaded therein.

The device (1) is adapted to deliver a therapeutic and/or prophylactic agent (117) or a formulation containing the therapeutic/prophylactic agent, such as a medicament or vaccine, which is in a solid, semi-solid or liquid form. Delivery is achieved by pushing effectively, the agent or formulation (117), which is initially housed within a cassette assembly (100) from that cassette into a human or animal body without the device itself pre-puncturing the body. The agent for delivery may be formulated as a tablet or microtablet, splinter or other solid dimensioned to fit with the cassette. Typically a "solid dose formulation" will be referred to throughout the description.

Figure 1A:
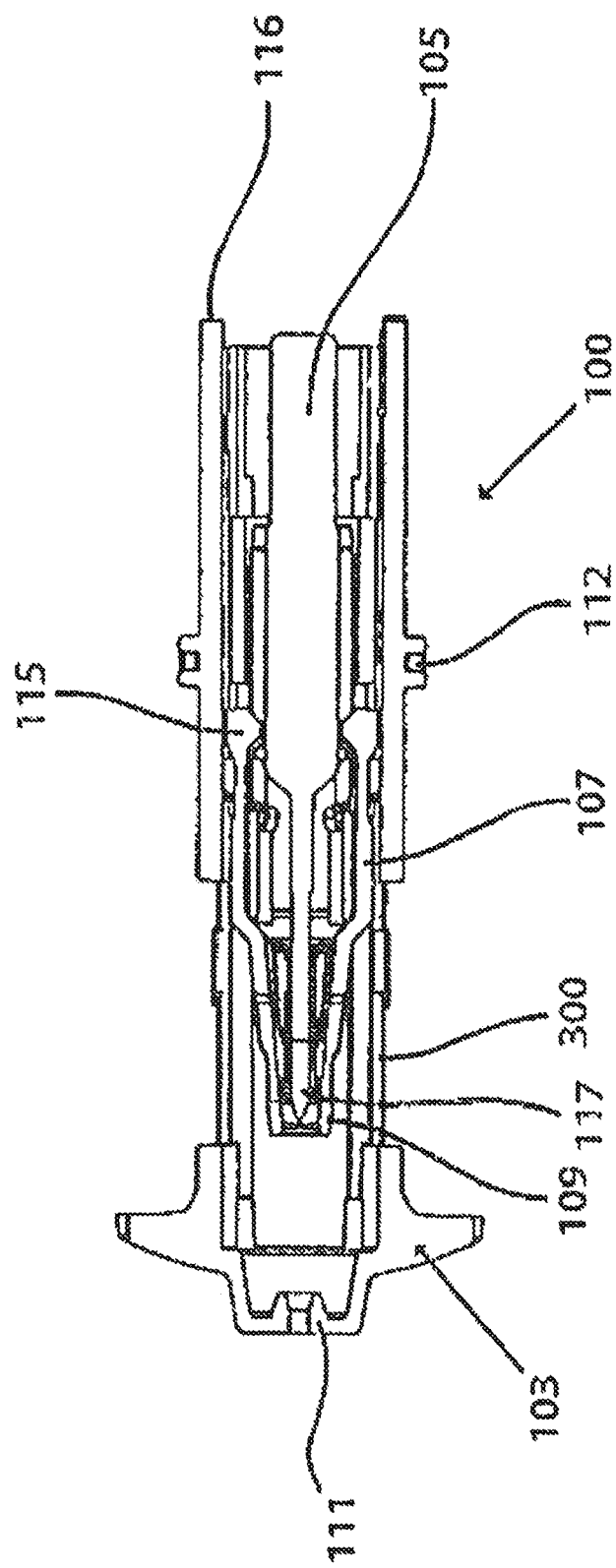
FIG. 1a shows a cassette assembly for loading into the needle-free delivery device comprising the therapeutic and/or prophylactic agent.

An example of the cassette assembly "cassette" to be used with the device is shown in FIG. 1a. At this point the cassette (100) may be pre-packaged for hygiene and is only unwrapped when ready to be loaded into the device (1).

The cassette (100) comprises a cassette body (103) a carriage (107) which in turn houses a centrally positioned cassette pin (105) and a solid dose formulation (117). These components are initially fixed in position within the cassette body. The carriage is releasably secured within the cassette body and held in place by pre-release legs (not shown) before actuation. The cassette body further comprises an opening cone (111) at the very front-end or proximal location of the body.

The carriage includes two jaws (109) located in the front-end of the carriage (107). The solid dose formulation (117) is held by compression acting on its external surface. In particular, the lateral compressive forces of the jaws generate sufficient friction to retain the solid dose (117) in this position within the carriage (107) during storage and general movement or transport of the cassette until the point of loading and actuation of the delivery device. The cassette pin (105) is positioned behind the solid dose formulation (117) abutting a rear-facing end thereof. The cassette pin is initially held in place within the carriage (107) by a set of pin release clips (115). The pin release clips are latched onto corresponding groove or grooves in the pin during the assembly of the cassette (100).

The cassette (100) further includes bayonet pegs (112), which serves to help connect and release the cassette from the actuator.

Referring back to FIG. 1, the needle-free delivery device (1) itself comprises a housing (212) with front-end component/section (212a) and rear-end component/section (212b). The sections are in internal operative communication with one another and in embodiments are arranged in such that the two parts of the external housing rotate with respect to one another.

The rear-end component (212b) houses a force generating means, here shown as a compression or actuation spring (214) and a rear piston (215). The force generated is from about 10-40 N, more preferably 15-35 N and most preferably 18-31 N. Behind the spring is a compression bar (234) which provides a contact surface against which the spring can act.

The front-end component (212a) includes a front piston (218). The front piston (218) is slidably mounted within the device such that when the cassette is loaded, pushing against a proximal end of the device causes a front surface of the cassette to engage with a body surface and the cassette and then front piston to slide up within the front-end component in order to prime and ultimately actuate the device. The front piston further defines a central axis (X) and a central aperture therein (250). A reset spring (244) is located in the front-end and situated between the front piston (218) and an alignment sleeve reset spring seat (209).

The front and rear-end housing components (212a; 212b) are in operative communication through a spindle (210). The spindle (210) includes spindle tip (211) which is ultimately adapted to connect with the drive pin (105) of the cassette (when loaded) to push the therapeutic and/or prophylactic agent (117) from the cassette (100) into the human or animal body when the spindle is aligned with the central axis (X) and thus during actuation is adapted to pass through central aperture (250).

In this example, a proximal end of spindle, proximal being defined as the end of the spindle closest to the patient skin site against which the device is pushed, comprises spindle tip (211), which is made of a material which is drawn to (and may connect with) a magnetic ring (205). The magnetic ring therefore acts independently within the structural arrangement of the device as a spindle retaining element and is configured to reliably hold the spindle tip in the axially offset position. The magnetic ring will continue to do so until the device is actuated. However, the feature of the magnetic ring (205) could equally be an alternative structure; one which acts to laterally displace and hold, of the spindle and/or its tip. This feature referred to elsewhere as and is unambiguously disclosed in combination with the other features provided in this example of invention, no matter the particular form, provided the independent functionality is met (i.e. the structure is solely provided and arranged to undertake that and no other function). For example, structural features that are already existing in the prior art and thus have a primary function within the disclosure of the mechanism would not meet this essential requirement because they would be liable to suffer the same issues of re-set failure and thus not plausibly solve the technical problem.

In the figure shown, the rear piston (215) adjoins the spindle (210) by a rotational joint (225/221). A rear-end of the spindle (210) is provided as a ball joint (221) connected to the rear piston via its socket (225). The ball-socket connection serves to control the axial position of the spindle tip (211) when the spindle moves laterally between axial alignment and non-axial alignment with the aperture in the front piston. This type of connection allows for the spindle to pivot with minimum friction improving the ability of the reset to be biased by the displacement mechanisms and be more precise and consistent.

The front and rear piston communicate via a rear aperture (243) and spindle (210) the distal end of which passes through the aperture (243) where it contacts a spring follower of the piston (215).

In this example, the spindle further is adapted with a middle region (231) and a shaped shoulder (231a), as illustrated. This feature is designed to connect with and following the profile of an alignment sleeve (260). This allows for auto actuation: the spindle is required to be drawn from non-alignment into axial alignment with the central aperture (250), such that when it is fully primed the device automatically actuates.

Accordingly, an inner surface (260/232) of the alignment sleeve is shaped to generally guide the spindle (shoulder region (231a) of the spindle's middle section (231) and forces the spindle tip to move from the offset resting position and radially inwards towards the central axis (X). Ultimately, when the device is fully primed, the spindle tip will fully align with the central aperture (250) in the front piston (218) such that it will be driven by the actuation spring (214) in a straight direction and through the central aperture (250) where it contacts the drive pin (105).

Figure 2:
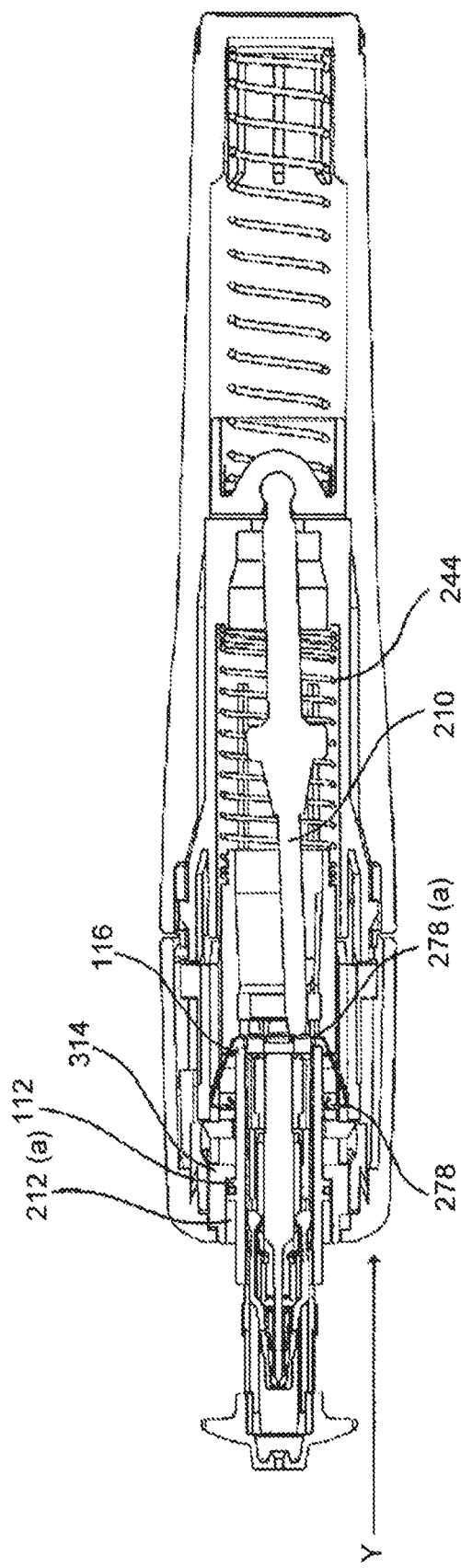
FIG. 2 shows a cross-sectional view of the device of FIG. 1 wherein a cassette package comprising the therapeutic and/or prophylactic agent has been inserted into the front-end, rotationally engaged therewith and connected securely, ready for use.

Cassette Connection:

FIG. 2 shows how the cassette is aligned with and loaded into the device. It is further helpful that the connection of the cassette and device provide positive feedback to the user. Therefore, a bayonet-type connection providing sufficient visual or other feedback to indicate the cassette is securely connected is preferable.

The present device therefore additionally provides embodiments and examples in which a connection feedback mechanism provides tactile information, further to a visual feedback, that the cassette is securely connected and ready to be actuated.

In the present case when operation is ready to begin, the user aligns the cassette bayonet pegs (112) of the cassette (100) with the bayonet opening (315) in the front-end (212a) of the device (1) via a bayonet connecting ring (314) which comprises an opening (315) and dead stop. The user may be further aided with the help of connection indicators I and II (151, 251), provided on the cassette body and proximal end of the front-end respectively. Some of these individual features e.g. peg (112) and connection indicators I/II (151, 251) can be visualised more clearly in FIGS. 9a and 9e.

FIG. 2 shows the cassette partially loaded by pushing the cassette toward direction Y. The cassette may be aligned with the front-end component without touching the cassette by use of an applicator or assembly aid. The assembly aid (not shown) may inherently be formed from the packaging in which the sterile cassette is stored before use or be a separate component stored inside the package and additional thereto, as part of a kit. The assembly aid is shaped to easily temporarily encase the cassette, or part thereof, for alignment and insertion of the cassette with the actuator.

When the packaging is opened it can be additionally used to hold the cassette, or the separate aid may be already mounted on the cassette, and used in order to first align with the actuator and insert the cassette into the delivery device without contacting it directly.

By inserting the cassette in this direction within the front-end of the device, the reset spring (244) compresses and creates contact between the spindle (210) and the back face (278a) of pre-release clip (278), until the cassette bayonet peg (112) contacts the bayonet connecting ring (314) dead stop.

Once the cassette (100) is inserted in the actuator, a contact between the cassette surface (116) and the front piston is created.

At this point, the cassette (100), still held by the assembly aid, is easily able to be rotated clockwise which pushes the front piston further inside the device via a cam mechanism, which for example, is generated by the cassette tactile ramp (not shown) and the inner ramp within the front piston. The front piston then moves back as the cassette is locked in axial rotation.

As the cassette (100) rotates until it reaches a rotational dead stop, the cassette tactile ramp leaves the front piston inner ramp due to a drop in the front piston inner ramp profile. This drop generates an internal impact as the front piston moves forward sharply generating light vibrations for tactile feedback. At this point, the cassette is securely connected in the actuator.

The cassette peg (112) is now retained in a track and thus the cassette (100) cannot move forward and the spindle (210) is in contact with the back face of the front piston pre-release clip (278a). The front piston (218) also helps releasably secure the spindle (210) in the non-axially aligned position during priming by a physical surface connection between the spindle tip (211) and a back surface of the front piston.

The pin release clips (115) of the cassette cannot extend as they are constricted by the inner diameter size of the cassette body (103). The pin release clips are 'V' shaped to control the axial position of the cassette pin (105) inside the carriage (107). The pin is therefore made more secure and this movement control feature ensures no unintentional forward motion relative to the carriage (107) is transferred to the solid dose prior to intentional actuation of the device by way of the user in the way described below.

Figure 3:
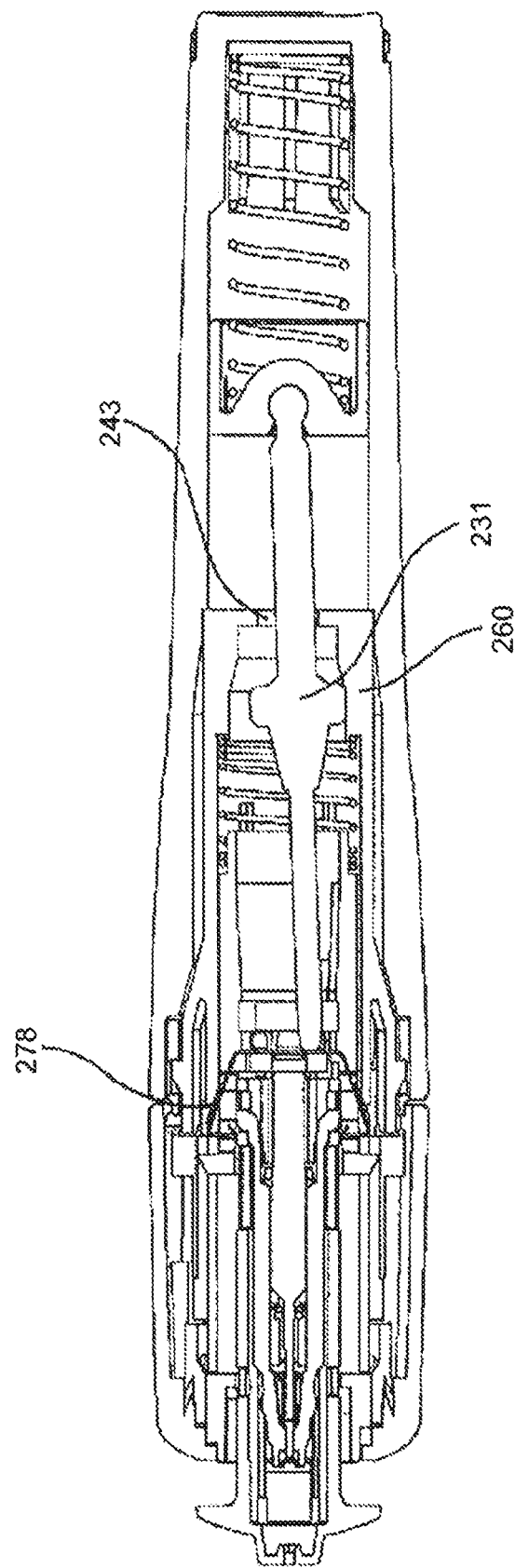
FIG. 3 shows the arrangement of the device of FIG. 1 during the priming (pre-actuation) stage.

From this point, as shown in FIG. 3, the device is ready to use.

Figure 4:
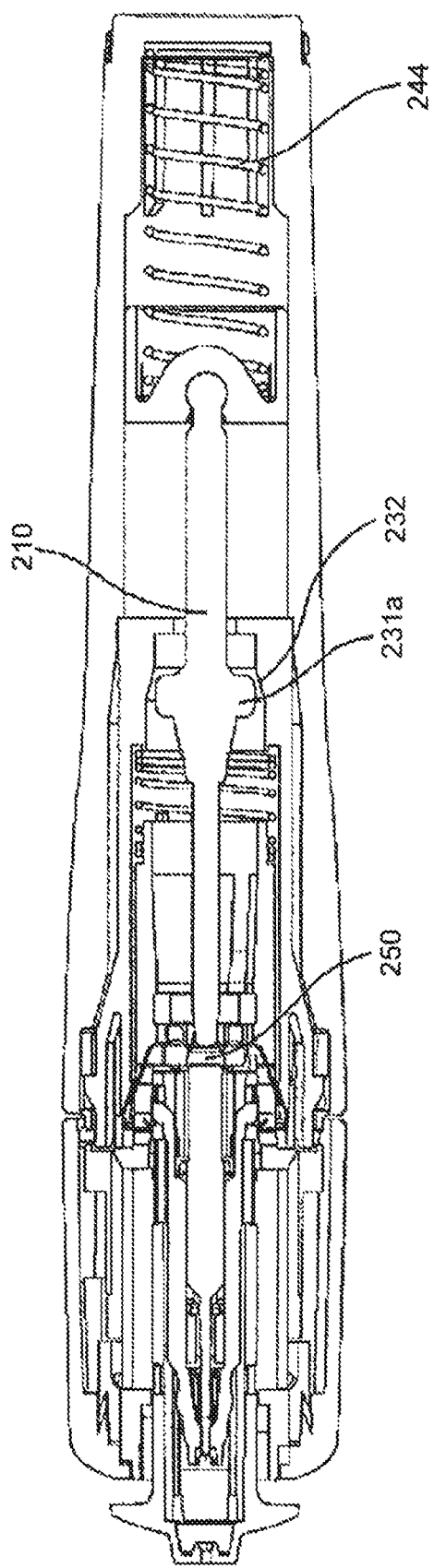
FIG. 4 shows the arrangement of the device of FIG. 1 immediately prior to automatic actuation.

Actuation:

In practice, a user holds the device about its housing and presses firmly against the patient's skin. This first causes the skin to be tensioned and then any pressure applied to the cassette will compress both the reset spring (244) and actuation spring (214) via relative contact by the spindle (210). FIG. 4 shows an illustration of the device in which compression against the skin has initiated.

As it does so, the spindle slides through the rear aperture (243) and the rear-end (221) of the spindle pushes against the spring follower (215) causing the actuation spring (214) to be compressed thereby charging the device with potential energy. The spindle middle section (231) contacts the alignment sleeve ramp which brings the spindle tip (211) toward the central axis (X) which will enable release of the spindle through the central aperture (250) of the front piston. At the same time, the pre-release clips (278) in the front piston (218) deflect when contacting a front edge of the alignment sleeve, releasing the carriage (107) from the cassette body (103).

At the point illustrated in FIG. 4, the shaped shoulder region (231a) has been drawn into the shaped foremost surface (232) and the action of the reset spring (244) is countered so the actuation spring (244) is fully charged and upon axial alignment of the spindle tip with the central aperture (250) the device will automatically actuate.

Figure 5:
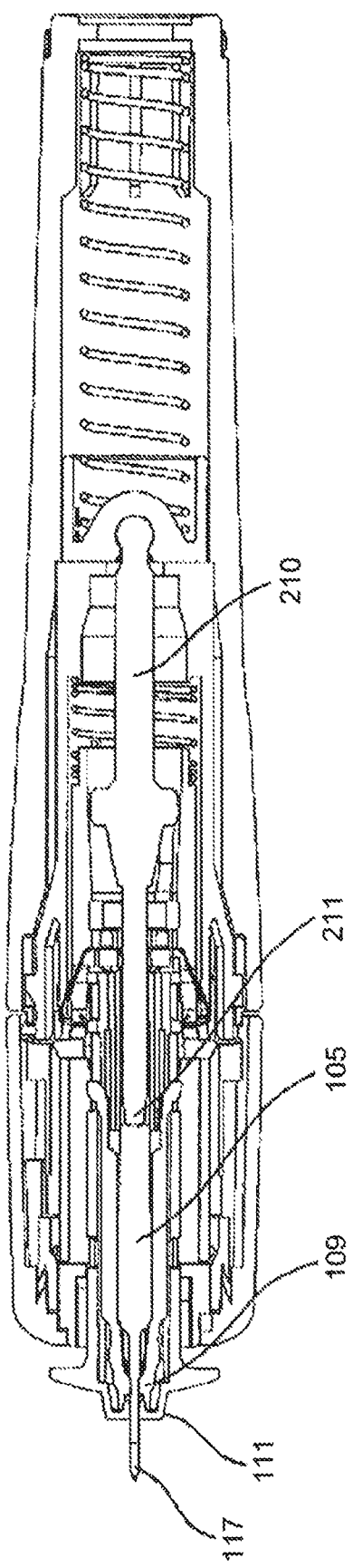
FIG. 5 shows the arrangement of the device of FIG. 1 immediately after actuation.

In doing so, as shown in FIG. 5, the actuation spring (244) forces the spindle tip (211) and spindle (210) through the aperture (250) causing it to push the drive pin (105) which in turn causes the therapeutic and/or prophylactic agent (117) to be dispensed into the human or animal. Significantly, the longitudinal axis of the spindle can't be aligned with the aperture (250) until the required actuating force is reached which is set to coincide with the point at which the shaped shoulder region (231a) moves in the general region of recessed surface (232) thus providing a safety mechanism against accidental actuation.

The spindle drives the carriage (107), drive pin (105) and drug or solid dose (117) forward. The carriage retaining jaws (109) hit the opening cone (111) in the cassette body and stop, and the solid dose or drug (117) under force from the drive pin (105) continues forward and is released from the carriage and cassette into the body of the human or animal without need for a separate needle to penetrate the skin. The spindle moves only a short distance before impacting the drive pin. The potential energy available is therefore important as to pierce the skin the solid dose needs to hit the skin at a given distance. The drive pin, carriage and solid dose move together until the carriage hits the opening cone, whereby 12 mm is the approximate given distance between solid dose and skin.

Resetting

As the device is re-usable it is then desired that the cassette can be disconnected and removed from the actuator and discarded in a safe way, so that the device can be used with a new cassette and drug for delivery. Further specific methods and features involved in disconnecting the cassette are described fully herein below.

Figure 6:
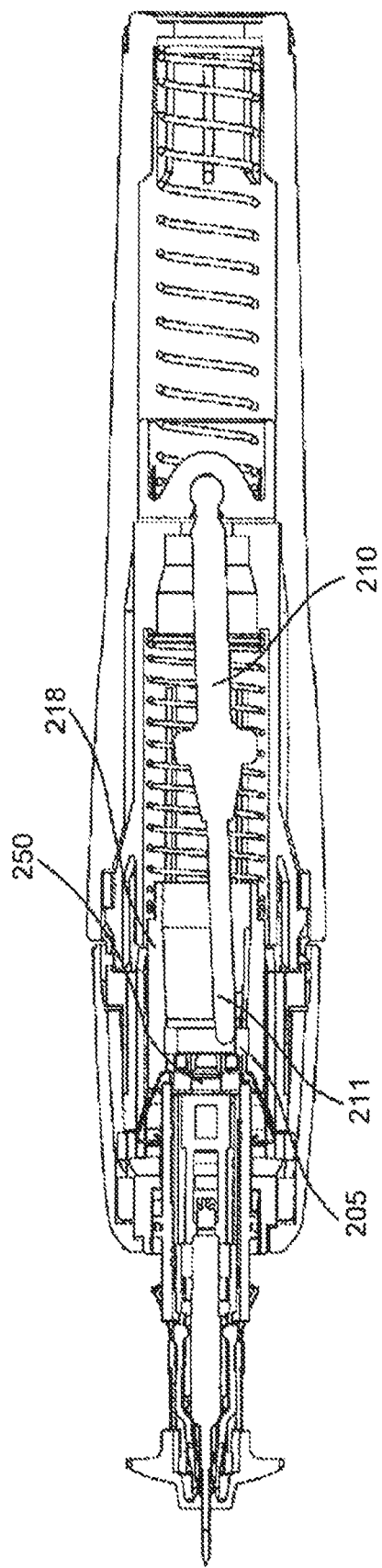
FIG. 6 shows the device of FIG. 1 during the re-setting actuation.

FIG. 6 shows the device immediately following reset, where the spindle (210) is in the resting position and the springs are reset.

The resetting action requires the front piston (218) to move forward into a position where the spindle tip is no longer engaged with or resting near the front piston central aperture (250). As will be described further below, the reset spring (244) also assists to push the front piston (218) and, indirectly, the used cassette to enable it to be expelled it from the device when the cassette is released, as described in detail further below.

In this example, the reset spring (244) does not draw the spindle (210) from alignment with the aperture (250); it does not provide any lateral force to draw the spindle off-centre. As noted the spindle tip must reliably remain off central axis.

Resetting is only made possible in this example by a spindle retaining element which specifically, independently assists the spindle into the laterally/radially offset position, post actuation, such as the magnetic ring (205) which attracts the spindle tip (211) back towards it as shown in FIG. 6. This feature therefore acts as active displacement means and is configured to retain the spindle tip in the axially offset position until the mechanism of priming and actuation overrides that positional bias.

The structural example used herein is not limiting and any embodiment sufficient to provide the axial reset by laterally displacing the spindle would be within the scope of the invention.

A unipolar radial magnetic ring inside the back open end of the front piston applies a magnetic field which attracts the metallic spindle (10) hinged at the ball socket joint (225/221). During the reset phase, the front piston (212a) moves forward due to the reaction force applied by the reset spring (244), allowing the spindle to disengage from the piston central aperture (250) and be drawn towards the magnetic ring (205).

Figure 7:
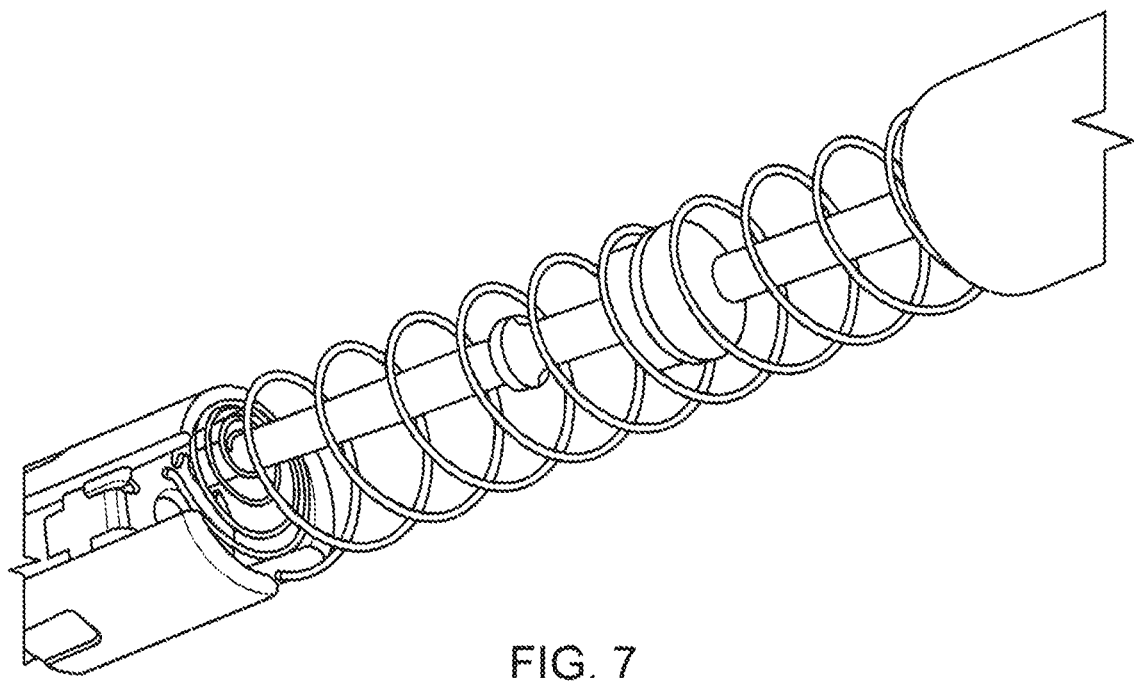
FIG. 7 shows an alternative structural arrangement providing the means for retaining the spindle tip of the device in the axially off-set position.
Figure 8:
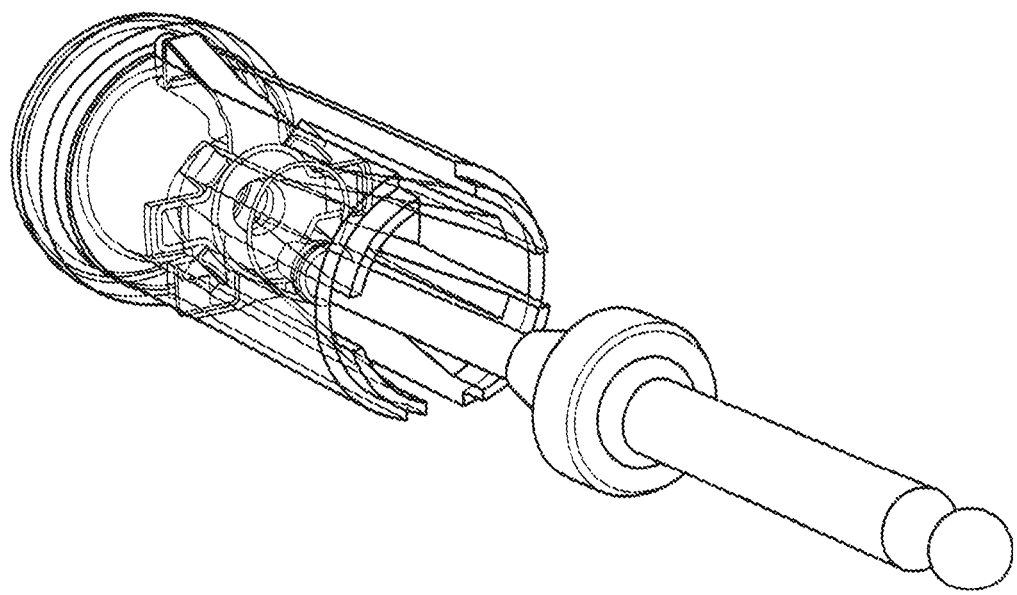
FIG. 8 shows a further alternative structural arrangement providing the means for retaining the spindle tip of the device in the axially offset position.

The following further examples, shown in FIGS. 7 and 8, may be used as alternative solutions to the magnetic ring shown in the previous figures to keep the spindle tip off the central axis of the aperture (250). In each case an additional component or structural element beyond the normal spring (used as part of the reset) is present in the device. Such a feature therefore structurally and functionally meets the requirement whereby it is configured exclusively to retain the spindle in the axially offset position.

One end of the reset spring (244) comprises an additional feature of secondary spring coiled in a helix pattern as shown in FIG. 7. The inner portion of the coil has an inner diameter slightly larger than the diameter of the front-end of the spindle (211). The last coil formed by the helix is off centre applying a lateral force which holds the tip of the spindle off axis from the aperture (250) as it hinges against the ball socket connection (225/221). The ball and socket joint enables the spindle to rotate in any plane. Alternatively in FIG. 8 a spring wire is formed with anchoring geometry to allow it to be attached to the front piston (20). The spring is formed with a dual pitch coil holding the tip of the spindle (211) off centre from the aperture (250) by applying a lateral force which brings the tip of the spindle (211) off axis as it hinges against the ball socket connection (225/221).

Release and Ejection of the Cassette from Device

The series FIGS. 9a, 9b, 9c, 9d and 9e show how after solid dose injection, the disposable cassette can be removed "hands free" by a twist-release mechanistic arrangement. This arrangement is structurally defined within the housing sections and utilises some of the existing structures of both the cassette and the device to yield more functionality for the needle-free device. This arrangement is not limited to but may also be of the type of needle-free device described herein above.

In particularly preferred embodiments, including the examples shown in 9a through to 9e, features of the needle-free device for hands-free cassette ejection are utilised with before described examples of the needle-free device for delivery of a therapeutic or prophylactic agent.

The cassettes used with the device herein are intended to be single-use disposable items and when device actuation is complete and the drug has been delivered therefrom, the cassette is empty and must be removed from the device and disposed of.

Figure 9A:
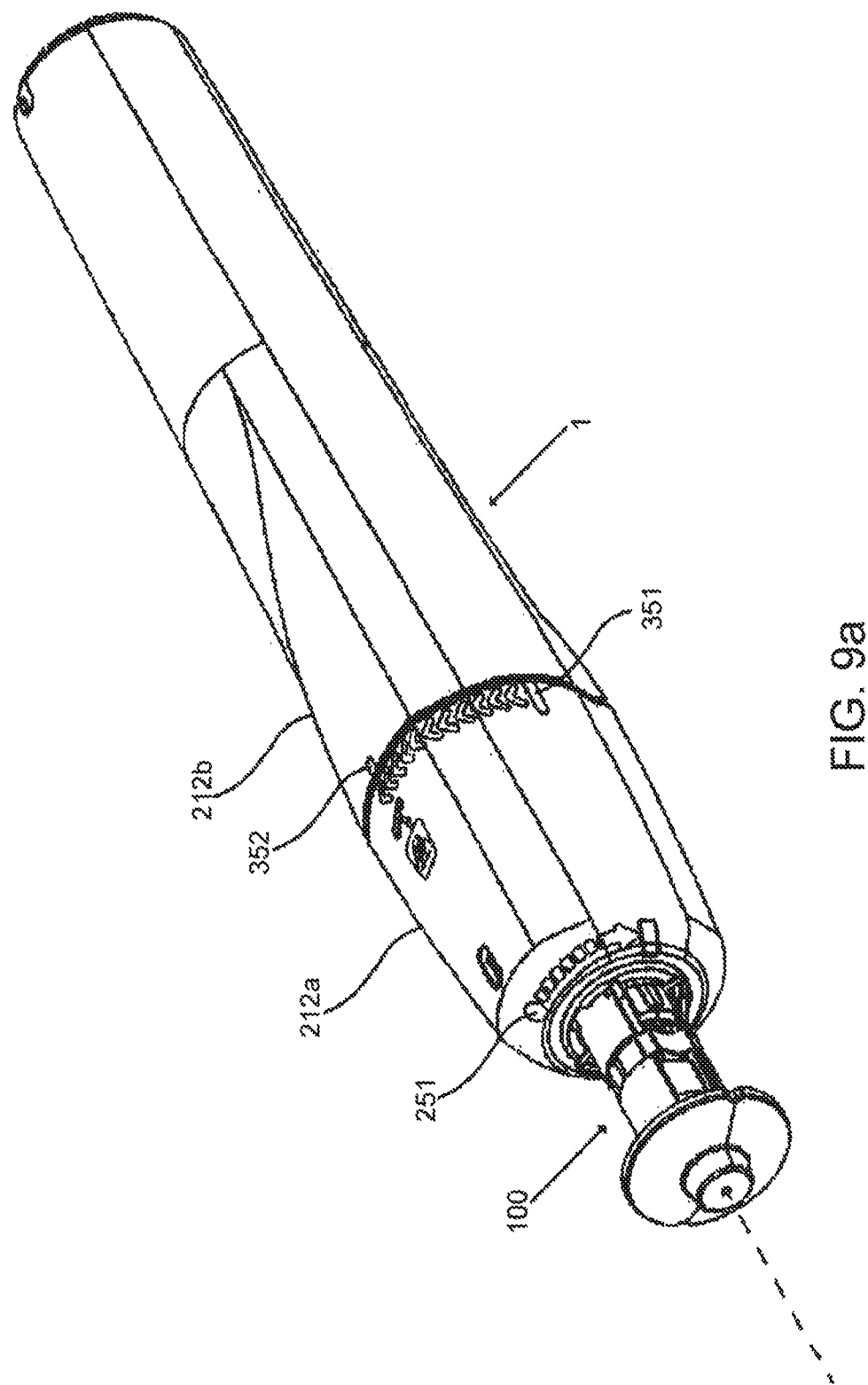
FIGS. 9a-e show a combination of perspective and cross-sectional views of a further aspect of invention in which a needle-free device comprises a novel hands-free cassette ejection mechanism. This aspect of the invention may also be combined, as per the example, with the device invention according to any embodiment previously described and in relation to any of the features exemplified in FIGS. 1 through to 8.
Figure 9B:
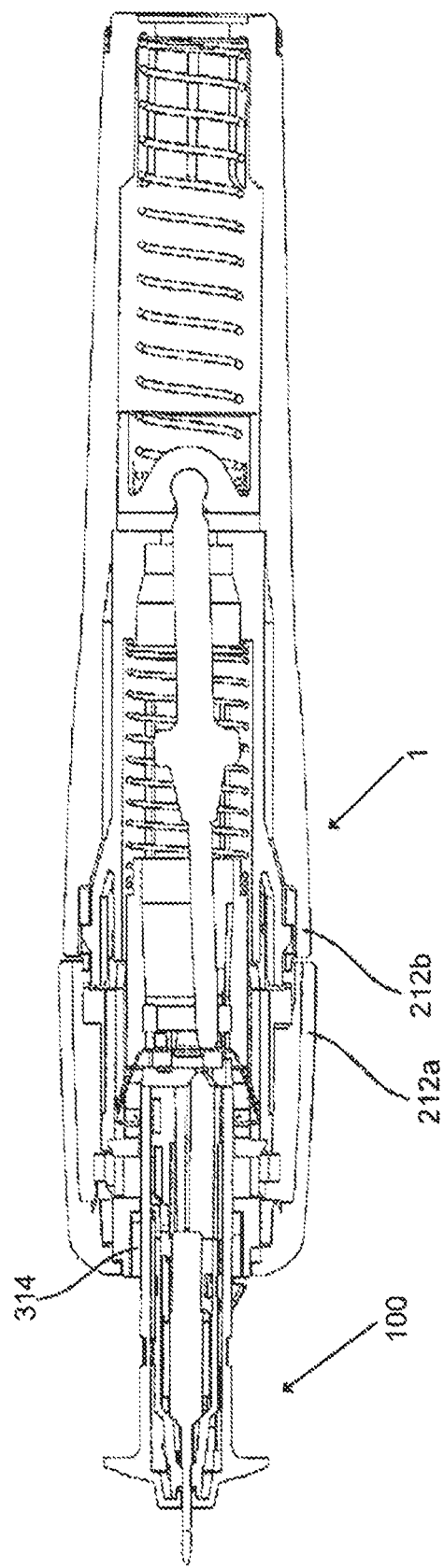
Figure 9C:
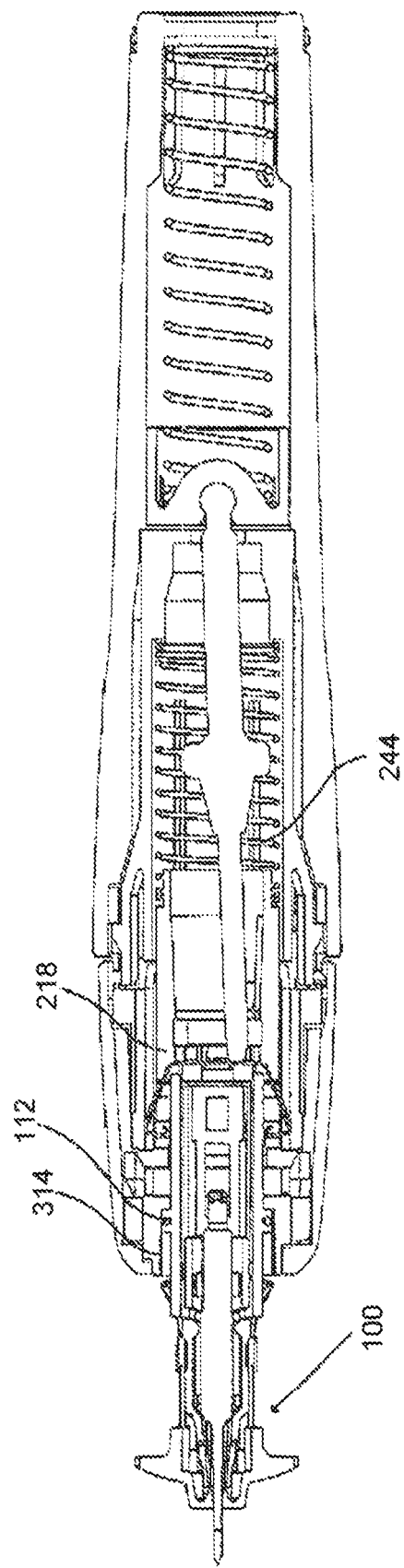

As shown in FIG. 9a, in order to enable an improved release and ejection of the cassette (100) from the device, the user can rotate or twist the front-end casing (212a), relative to the rear-end casing (212b) about the main axis (X) of the device by approximately 90 degrees. FIG. 9b shows the start of the "twist release" movement as the start of the action, where the device is provided in cross section.

In doing so, release indicator I (351) provided at the distal end of the front-end casing is moved in a rotational direction towards release indicator II (352) on the proximal end of the rear-end casing, such that the two release indicators I and II are in alignment and a dead stop is reached. In this example, a visual guide (340), shown here as a plurality of chevrons, may assist the user by indicating clearly the direction of travel the front-end must take to correctly align the two release indicators.

The position after fully twisting the front-end housing casing is additionally shown in FIG. 9 *e* where there is alignment of release indicators I, II (351, 352).

As the movement is occurring, the front-end is internally connected by a twist release ring (357) in axial rotation via a set of interacting ribs. The twist release ring (357) comprises a release finger (353) which can rotate axially in a dedicated track in the before described bayonet connecting ring (314). This track is also aligned with the axial position of the cassette bayonet peg (112) of the cassette (100). The release finger feature (353) makes lateral contact with the cassette bayonet peg (112) when the cassette is connected. The structural link between these features means that when the front-end casing (212*a*) is rotated as described, the twist release ring (357) rotates and the release finger (353) engages the cassette in rotation via its contact with the cassette bayonet peg (112) until the peg reaches the bayonet opening (315) in the bayonet connecting ring (314). In other words, the twisting mechanism of the outer casings permits the cassette to be released from the internal structures previously constraining or holding the cassette firmly within the front-end of the device. The features of the twist release ring (357) and release finger (353) can be seen more easily in cross-sectional view FIG. 9*d*, where the cassette is absent.

Figure 9D:
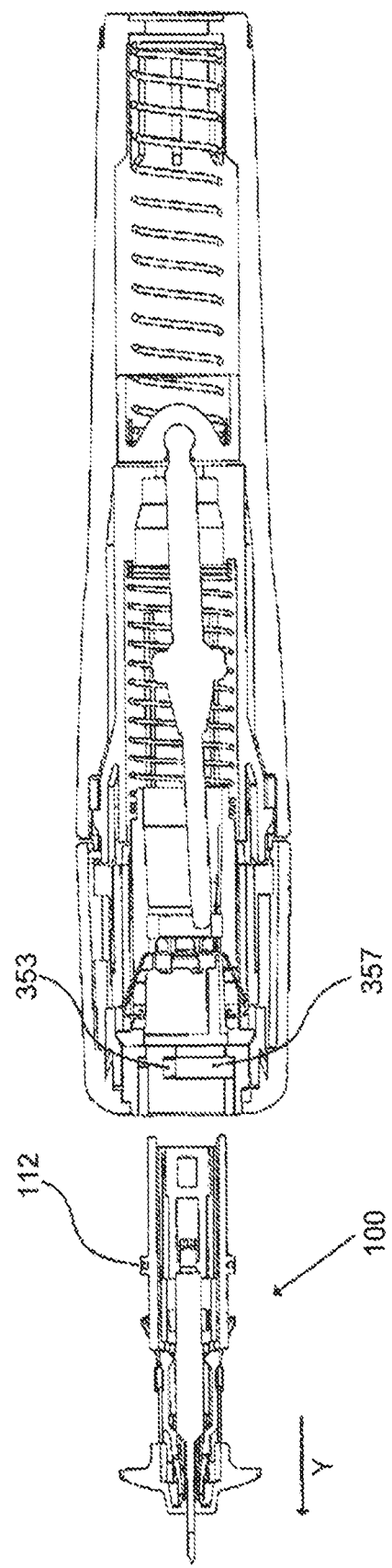
Figure 9E:
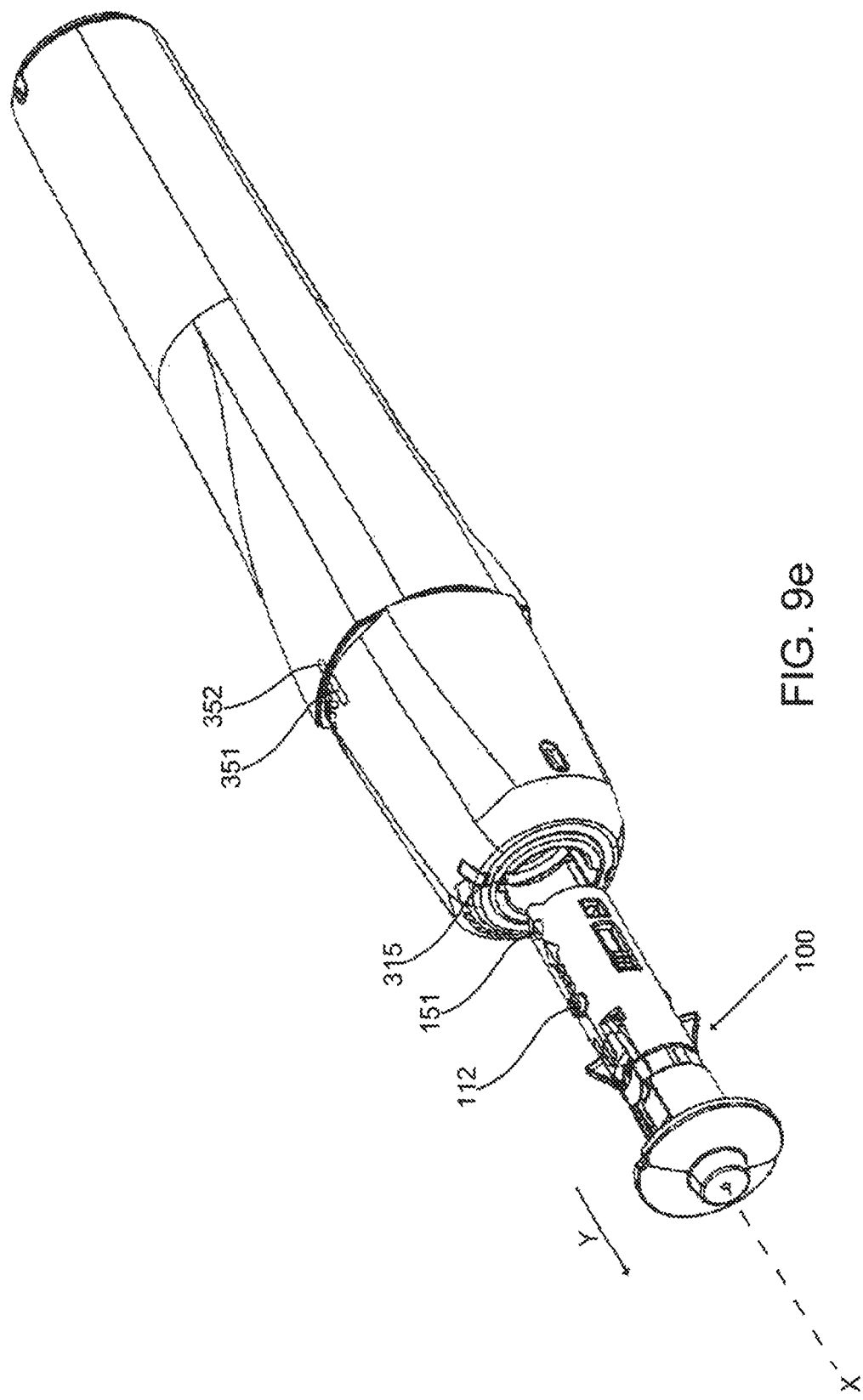

As previously described, the cassette (100) is in contact with the front-end piston (218). Since at this point the reset spring (244) exerts a reaction force on the front-end piston (218), when the bayonet peg (112) reaches the opening (315) in the bayonet connecting ring (314), the front piston moves forward under the force of the spring. Any potential friction force which could retain the cassette in the device is overcome by that force. As shown in FIGS. 9*d* and 9*e*, the quick release of energy ensures the cassette (100) is fully ejected from the front-end (212*a*) and out of the device in direction Y.

The force of ejection is sufficient to enable the cassette to be directly disposed of into an appropriate unit/container/bin or the like without further assistance. No manual handling of the cassette is required to remove and/or transport the cassette post removal to a place of disposal.

After ejection, the user may stop exerting torsional force on the front-end casing (212*a*) relative to the rear-end casing (212*b*) which allows the front-end to automatically return in its original position via an internal torsion spring (not shown). The device is then reset and ready for a new cassette to be inserted and connected with the device and the device to be re-used to deliver a new therapeutic or prophylactic agent by the needle-free mode of operation.

The invention claimed is:

1. A needle-free device for the delivery of at least one therapeutic and/or prophylactic agent comprising a housing having:
   a rear-end including a force generator and rear piston;
   a front-end for receipt of a cassette comprising a solid therapeutic and/or prophylactic agent for delivery, the housing comprising a front piston having a central aperture defining an axis, the piston being slidably mounted within the front-end;
   a spindle positioned between the front-end and rear-end and operatively communicating the rear piston with the front-end, the spindle, having a spindle tip, configured to be laterally movable between a position axially aligned with the central aperture and an axially offset position;
   a reset spring seat;
   a reset spring, positioned between reset spring seat and the front piston; and
   a spindle retaining element, structurally and functionally configured to exclusively retain the spindle in the axially offset position.

2. The device of claim 1, whereby the spindle retaining element is positioned proximal and/or adjacent to the spindle tip.

3. The device of claim 1, whereby the spindle retaining element holds the spindle tip in the axially offset position by an attraction force.

4. The device according to claim 1, wherein the spindle retaining element is magnetic.

5. The device according to claim 1, wherein the spindle comprises a material attracted to the spindle retaining element.

6. The device according to claim 1, wherein the spindle retaining element is configured to physically bias the spindle into the axially offset position.

7. The device according to claim 6, wherein the spindle retaining element comprises a coil housed within the reset spring, wherein the apex of the coil is axially offset.

8. The device according to claim 1, wherein the spindle retaining element comprises a spring wire adapted to anchor the spindle in the axially offset position.

9. The device according to claim 1, further comprising a spindle alignment mechanism.

10. The device according to claim 9, wherein the spindle alignment mechanism comprises an alignment sleeve having a ramp adapted to guide a middle section of the spindle causing lateral movement of the spindle tip toward the axially aligned position.

11. The device according to claim 1, wherein the force generator comprises an actuation spring.

12. The device according to claim 11, wherein the reset spring and the actuation spring are provided in parallel.

13. The device according to claim 1, wherein rear piston adjoins the spindle by a rotational joint.

14. The device of claim 13, wherein the rotational joint comprises a female connection or socket for the receipt of a corresponding male connection, located at the rearward end of the spindle.

15. The device of claim 1 in combination with a cassette for use with the device, the cassette housing a tablet, microtablet or splinter comprising at least one therapeutic and/or prophylactic agent.

16. The device of claim 1, wherein the device further comprises a connection feedback mechanism which provides tactile signal to the user, in addition to a visual feedback, that the cassette is securely connected and the device is ready to be actuated.

17. The device according to claim 16, wherein the tactile signal is a vibration.

18. The device of claim 1, further comprising a cassette release and automatic ejection mechanism, wherein an external casing of the front-end and an external casing of the rear-end are axially rotatable relative to one another and twisting the casings, releases the cassette from an internal structural constraint within the front-end such that force of the reset spring acting on the front piston causes automatic ejection of the cassette from the device.

* * * * *